United States Patent
Wang et al.

(10) Patent No.: US 10,062,061 B2
(45) Date of Patent: Aug. 28, 2018

(54) PAY-BY-PHONE PARKING SYSTEM AIDED BY A VISION BASED MONITORING DEVICE

(71) Applicant: CONDUENT BUSINESS SERVICES, LLC, Dallas, TX (US)

(72) Inventors: Yao Rong Wang, Webster, NY (US); David Preston Cummins, McLean, VA (US)

(73) Assignee: Conduent Business Services, LLC, Dallas, TX (US)

(*) Notice: Subject to any disclaimer, the term of this patent is extended or adjusted under 35 U.S.C. 154(b) by 791 days.

(21) Appl. No.: 14/614,493

(22) Filed: Feb. 5, 2015

(65) Prior Publication Data
US 2016/0232500 A1 Aug. 11, 2016

(51) Int. Cl.
| | |
|---|---|
| G06Q 20/16 | (2012.01) |
| G06Q 20/10 | (2012.01) |
| H04N 7/18 | (2006.01) |
| G06Q 30/02 | (2012.01) |
| G07F 17/24 | (2006.01) |
| G06Q 20/12 | (2012.01) |
| G07B 15/02 | (2011.01) |
| G06Q 20/14 | (2012.01) |
| G06Q 20/32 | (2012.01) |

(52) U.S. Cl.
CPC ......... *G06Q 20/102* (2013.01); *G06Q 20/127* (2013.01); *G06Q 20/145* (2013.01); *G06Q 20/16* (2013.01); *G06Q 20/322* (2013.01); *G06Q 20/3224* (2013.01); *G06Q 30/0284* (2013.01); *G07B 15/02* (2013.01); *G07F 17/24* (2013.01); *H04N 7/18* (2013.01)

(58) Field of Classification Search
CPC .. G06Q 30/0284; G06Q 20/00; G06Q 20/102; G06Q 20/322; G06Q 50/30; G06Q 20/027; G06Q 20/145; G06Q 20/3224; G06Q 30/0266; G06Q 50/10; G06Q 2240/00; G06Q 20/08; G06Q 20/16
See application file for complete search history.

(56) References Cited

U.S. PATENT DOCUMENTS

| | | | |
|---|---|---|---|
| 7,312,722 B2 | 12/2007 | Tillotson et al. | |
| 7,889,099 B2 | 2/2011 | Aubrey et al. | |
| (Continued) | | | |

FOREIGN PATENT DOCUMENTS

| | | |
|---|---|---|
| WO | 2005050575 | 2/2005 |

*Primary Examiner* — Elda G Milef
(74) *Attorney, Agent, or Firm* — Gibb & Riley, LLC

(57) ABSTRACT

Methods and devices send, from an application to an image processor, an identity of a vehicle parking space and/or an identity of a vehicle parked in the vehicle parking space. Such methods and devices obtain an image of the parked vehicle, using a fixed camera, and send the image to the image processor. These methods and devices then confirm the identity of the vehicle parked in the vehicle parking space, and send a confirmation to the application. These methods and devices display the confirmation on the graphic user interface of the user portable computing device (using the application). These methods and devices automatically end the timed payment session for the vehicle parking space based on images of the scene obtained through the camera showing the identified vehicle not occupying the vehicle parking space, using the image processor.

17 Claims, 11 Drawing Sheets

(56) References Cited

U.S. PATENT DOCUMENTS

| | | |
|---|---|---|
| 8,004,426 B2 | 8/2011 | Dasgupta |
| 8,131,596 B2 | 3/2012 | McQuilken |
| 8,325,063 B2 | 12/2012 | Dasgupta |
| 8,600,786 B2 | 12/2013 | Stefik et al. |
| 8,610,597 B2 | 12/2013 | Stefik et al. |
| 2003/0128136 A1 | 7/2003 | Spier et al. |
| 2004/0068433 A1 | 4/2004 | Chatterjee et al. |
| 2008/0071611 A1 | 3/2008 | Lovett |
| 2008/0114675 A1* | 5/2008 | Ward ............... G06Q 20/127 705/323 |
| 2010/0030708 A1 | 2/2010 | Ward, II |
| 2011/0258076 A1* | 10/2011 | Muirbrook ........... G06Q 20/20 705/26.41 |
| 2012/0078686 A1 | 3/2012 | Bashani |
| 2012/0130777 A1 | 5/2012 | Kaufman |
| 2012/0236149 A1 | 9/2012 | Nagy |
| 2012/0274482 A1 | 11/2012 | Chen et al. |
| 2013/0103460 A1 | 4/2013 | Groft et al. |
| 2013/0182110 A1* | 7/2013 | Tziperman ............. H04N 7/18 348/148 |
| 2013/0265419 A1 | 10/2013 | Bulan et al. |
| 2013/0265423 A1 | 10/2013 | Bernal et al. |
| 2013/0265426 A1 | 10/2013 | Fan et al. |
| 2013/0282448 A1* | 10/2013 | Rydbeck ............ G06Q 20/145 705/13 |
| 2015/0138001 A1* | 5/2015 | Davies ................. G08G 1/149 340/932.2 |
| 2016/0140774 A1* | 5/2016 | Weinberger ........... G07B 15/02 705/13 |

* cited by examiner

PAY-BY-PHONE PARKING SYSTEM AIDED BY A VISION BASED MONITORING DEVICE

BACKGROUND

Systems and methods herein generally relate to vehicle parking payment systems, and more particularly, systems and methods that integrate fixed cameras and smart phone apps to automatically identify a vehicle parked in a parking space, and to automatically identify the end of a timed parking session based on video monitoring.

Pay-by-phone parking is a technology that has advanced in recent years and is getting popular very quickly. Pay-by-phone parking allows any user (sometimes referred to herein as a driver or parker) parking their vehicle in a fare required space, the option to divert the expense to a credit card via the use of a mobile phone, mobile application or computer. Pay-by-phone parking has advantages over conventional pay systems that involve inserting change, notes or dollar bills into a parking meter, and payment for parking is made much easier for the parkers and for parking fee collection entities. Cities and municipals are adopting pay-by-phone at an increasing rate.

Pay-by-phone parking technology can be used in multiple ways including "start-stop" and "start-duration." With "start-stop" pay-by-phone parking, the driver contacts the pay-by-phone provider first when the driver initiates the parking session and then again when the driver wishes to terminate the session. Alternatively, with "start-duration" pay-by-phone parking, the driver contacts the pay-by-phone provider when the parking session is to be initiated, and the driver dictates the amount of time the session will last. There are inconveniences for the parker, and compliance issues for the service provider in both methods. In "start-stop" pay-by-phone parking, a parker may forget to "stop" after ending of the parking session resulting in the parker being charged for time they did not use the parking space. In "start-duration" pay-by-phone parking, the parker has to estimate the parking duration, which may result in the parker being charged for time they did not use the parking space, or for the parker not setting a long enough duration and potentially being fined.

SUMMARY

The following summary is provided to facilitate an understanding of some of the innovative features unique to the disclosed systems and methods and is not intended to be a full description. A full appreciation of the various aspects of the systems and methods disclosed herein can be gained by taking the entire specification, claims, drawings, and abstract as a whole.

With systems herein, a camera obtains images of a scene containing vehicle parking spaces. The camera is stationary and positioned to view the scene containing the vehicle parking spaces. Also, an image processor is operatively connected to the camera. An application comprising a program of instructions operates on a user portable computing device, and the application is in communication with the image processor over a computerized network.

The application can optionally register the vehicle by receiving information on make, model, and license plate number of the vehicle into the application through the graphic user interface of the user portable computing device.

The application causes a graphic user interface of the user portable computing device to display a "start timed parking" option to begin a timed payment session for a vehicle parking space (e.g., one of the vehicle parking spaces within the scene). The application sends the image processor the identity of the vehicle parking space and/or the identity of the vehicle parked in the vehicle parking space (in response to user selection of the start timed parking option).

The camera obtains an image of the vehicle parked in the vehicle parking space (in response to the selection of the start timed parking option) and sends the image of the vehicle parked in the vehicle parking space to the image processor. The image processor then confirms that the vehicle is parked in the vehicle parking space based on matching the image of the vehicle parked in the vehicle parking space with the identity of the vehicle parking space and/or the identity of the vehicle parked in the vehicle parking space, and sends a confirmation to the application. For example, the image processor can confirm the identity of the vehicle parked in the vehicle parking space based on information identified in the image of the vehicle parked in the vehicle parking space. Such information can include the license plate number of the vehicle, the make of the vehicle, the model of the vehicle, the identity of the vehicle parking space, etc.

The application causes the graphic user interface of the user portable computing device to display the confirmation. The confirmation identifies the vehicle parked in the vehicle parking space and identifies the beginning time for the timed payment session. The confirmation can identify the vehicle parked in the vehicle parking space by causing the graphic user interface of the user portable computing device to display the image of the vehicle parked in the vehicle parking space. Also, the confirmation can identify the vehicle parked in the vehicle parking space by causing the graphic user interface of the user portable computing device to display a make, model, and license plate number of the vehicle parked in the vehicle parking space. The confirmation can also cause the graphic user interface of the user portable computing device to display parking restrictions and a cost per unit time for the vehicle parking space.

Later, the image processor automatically ends the timed payment session for the vehicle parking space, based on images of the scene obtained through the camera showing that the identified vehicle no longer occupies the vehicle parking space. The image processor or the app then calculates the cost of the timed payment session based upon the duration between the beginning time and an ending time when the image processor automatically ends the timed payment session. Optionally, the application causes the graphic user interface of the user portable computing device to display the cost of the timed payment session, the duration, the beginning time, and the ending time.

In another example, the application causes the graphic user interface of the portable computing device to display an option to pay the cost of the timed payment session, and the application causes payment to be made for the cost of the timed payment session based upon selection of the option to pay the cost of the timed payment session.

Exemplary methods herein obtain images of a scene containing vehicle parking spaces using a stationary camera positioned to view the scene containing the vehicle parking spaces. Methods herein can register the vehicle by receiving information on make, model, and license plate number of the vehicle into the application. These methods display, on a graphic user interface of a user portable computing device, a start timed parking option to begin a timed payment session for a vehicle parking space of the vehicle parking spaces within the scene using an application comprising a program of instructions operating on the user portable computing device.

These methods send, from the application to an image processor, the identity of the vehicle parking space and/or the identity of the vehicle parked in the vehicle parking space in response to selection of the start timed parking option. The image processor is operatively connected to the camera, and the application is in communication with the image processor over a computerized network. Such methods obtain an image of the vehicle parked in the vehicle parking space, using the camera, in response to the selection of the start timed parking option and send the image of the vehicle parked in the vehicle parking space from the camera to the image processor.

These methods then confirm that the vehicle is parked in the vehicle parking space, based on the image processor matching the image of the vehicle parked in the vehicle parking space with the identity of the vehicle parking space and/or the identity of the vehicle parked in the vehicle parking space, and send a confirmation to the application. The process of confirming the identity of the parked vehicle can be based on information identified in the image of the vehicle parked in the vehicle parking space, including the license plate number of the vehicle, the make of the vehicle, the model of the vehicle, and the identity of the vehicle parking space.

These methods display the confirmation on the graphic user interface of the user portable computing device (using the application). The confirmation identifies the vehicle parked in the vehicle parking space and identifies a beginning time for the timed payment session. The confirmation can include: the image of the vehicle parked in the vehicle parking space; the make, model, and license plate number of the vehicle parked in the vehicle parking space; parking restrictions; the cost per unit time for the vehicle parking space; etc.

These methods automatically end the timed payment session for the vehicle parking space based on images of the scene obtained through the camera showing the identified vehicle not occupying the vehicle parking space, using the image processor. Then, the methods calculate the cost of the timed payment session based on the duration between the beginning time and the ending time when the image processor automatically ends the timed payment session. In turn, these methods display the cost of the timed payment session, the duration, the beginning time, and the ending time on the graphic user interface of the user portable computing device using the application.

Additionally, such methods can display, on the graphic user interface of the portable computing device, an option to pay the cost of the timed payment session using the application. Similarly, such methods can cause payment to be made for the cost of the timed payment session based upon selection of the option to pay the cost of the timed payment session, using the application.

Applications herein comprise a program of instructions operating on a user portable computing device. The applications work in conjunction with a camera that obtains images of a scene containing vehicle parking spaces. The camera is stationary and positioned to view the scene containing the vehicle parking spaces. The applications also work in conjunction with an image processor operatively connected to the camera. The applications are in communication with the image processor over a computerized network.

The applications cause a graphic user interface of the user portable computing device to display a start timed parking option to begin a timed payment session for a vehicle parking space of the vehicle parking spaces within the scene. The applications send the image processor the identity of the vehicle parking space and/or the identity of a vehicle parked in the vehicle parking space in response to selection of the start timed parking option.

The camera obtains an image of the vehicle parked in the vehicle parking space in response to the selection of the start timed parking option and sends the image of the vehicle parked in the vehicle parking space to the image processor. The image processor confirms that the vehicle is parked in the vehicle parking space based on matching the image of the vehicle parked in the vehicle parking space with the identity of the vehicle parking space and/or the identity of the vehicle parked in the vehicle parking space, and sends a confirmation to the applications.

The applications cause the graphic user interface of the user portable computing device to display the confirmation. The confirmation identifies the vehicle parked in the vehicle parking space and identifies the beginning time for the timed payment session. The image processor automatically ends the timed payment session for the vehicle parking space based on images of the scene obtained through the camera showing the identified vehicle not occupying the vehicle parking space. The image processor or app calculates the cost of the timed payment session based upon the duration between the beginning time and the ending time when the image processor automatically ends the timed payment session. The applications cause the graphic user interface of the user portable computing device to display the cost of the timed payment session, the duration, the beginning time, and the ending time.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
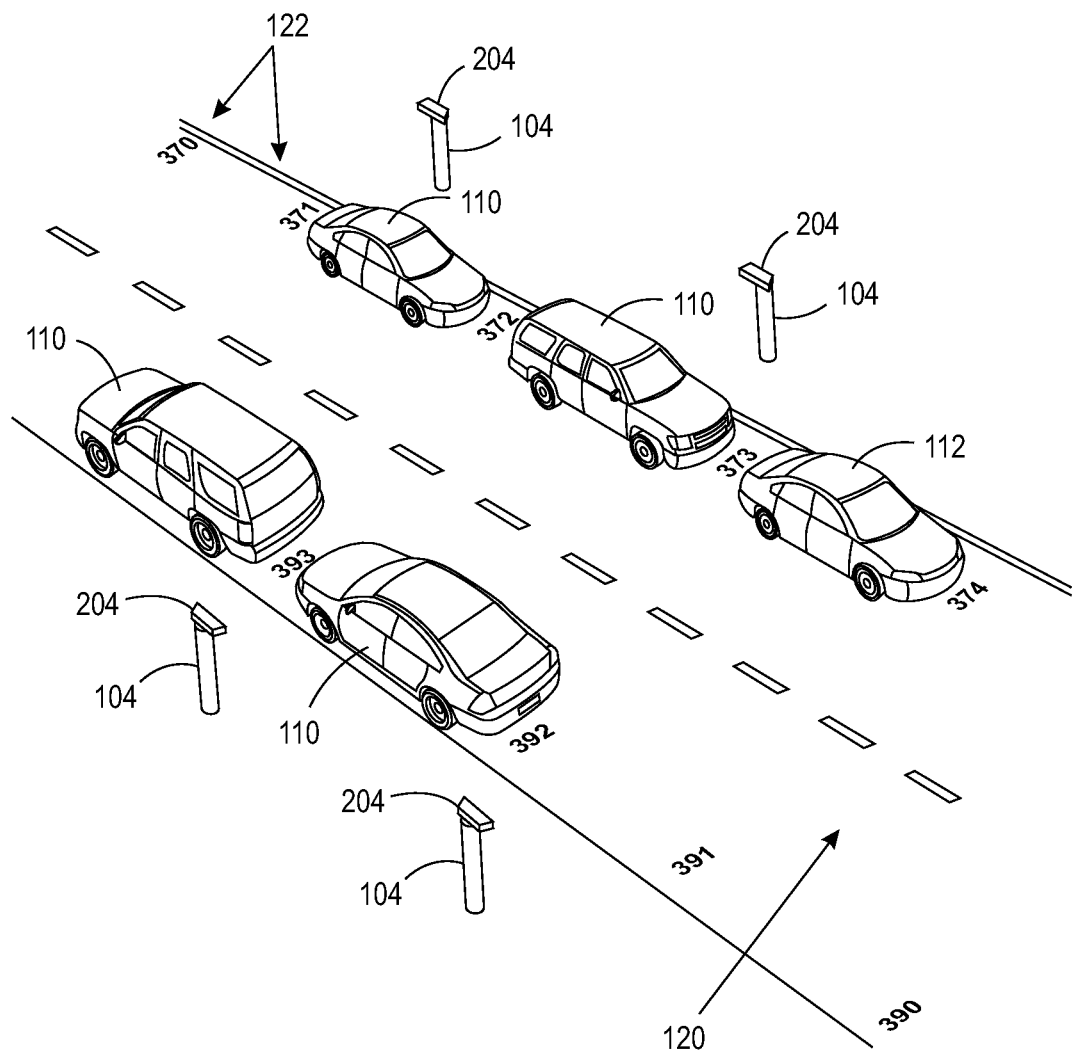
FIG. 1 is a schematic perspective diagram illustrating a parking scene.

As mentioned above, there are inconveniences for the parker, and compliance issues for the service provider in both the "start-stop" and "start-duration" pay-by-phone parking methods. The systems and methods herein simplify the current pay-by-phone parking processes and are cost effective for parking regulation enforcement and compliance.

The methods and devices herein include elements, such as a mobile device that can be a smartphone operated by the user (or "parker"), and the mobile device has a pay-by-phone app downloaded that is ready to be applied. The methods and devices herein include a vision-based device such as a camera monitoring the parking area and analytics that detect parking occupancy, can associate each parking vehicle with each parking space, record vehicles' parking duration, and maintain evidence such as images or video footages of parked vehicles for compliance. The methods and devices herein also include a back-end processing engine that processes parking fee payment transaction, compares parking occupancy data from the vision device with the number of current parking payment transactions for potential violations, determines on which parking spaces the violations are occurring, and notifies enforcement agent.

With the vision-based device of methods and devices herein, such as a camera, the parking area is monitored 24/7 for parking occupancy, and this permits tracking and recording parking durations for each vehicle. Further, with methods and devices herein, the pay-by-phone method is simplified to just "start," and the methods and devices herein automatically determine when the vehicle has left the parking space (to automatically end the parking charges) and automatically determine the parking duration and charge for parking the vehicle in the parking space. Therefore, the methods and devices herein dramatically simplify the process for the parker, and simply ask the parker to start the vision-based parking app, after which the app automatically confirms the vehicle identification (based on vision data from the camera) and automatically ends the parking charges, after which the methods and devices herein provide the user with different payment options to pay the parking charges.

Thus, with methods and devices herein, drivers are able to pay fees for the exact amount of parking time, while parking enforcement agencies save money by eliminating the need for manual enforcement. With the parking occupancy data (including parking duration) from the video-based parking occupancy detection systems herein (and driver's input from registration) the authorities can monitor a street to see whether all vehicles are legally parked.

In one example, with methods and devices herein the user optionally registers one or more vehicles through the app running on their mobile device. During such registration, the parker can indicate default payment methods (e.g., to a credit card, electronic wallet, etc.). In use, the user parks their vehicle in a parking area designated for pay-by-phone for parking, and they activate the vision-based parking app.

The user then simply confirms the location/identity of the parked vehicle and clicks a "start" icon on their mobile device for starting the parking session. Then, the parker simply drives the vehicle away from the parking space, and the methods and devices herein automatically end the parking session, without further input from the user.

Referring now to the accompanying drawings, FIG. 1 illustrates at least one fixed camera 204 (e.g., mounted on one or more poles or other stable structures 104 (such as buildings, fences, etc.)). As shown in FIG. 1, the cameras 204 are positioned to obtain images of cars 110, 112 parked in a public or private parking area 120. The cameras 204 may optionally rotate, zoom in-out, etc., but such cameras are stationary and may be permanently positioned at a single location, such as on poles 104. Note, that the parking area 120 can include numbered parking spaces that are distinguished by numbers 122 applied to the parking area 120 (e.g., numbered parking spaces 370-374 and numbered parking spaces 390-393 identified by painted numbers, stickers, etc., on the parking surface 120).

Figure 2:
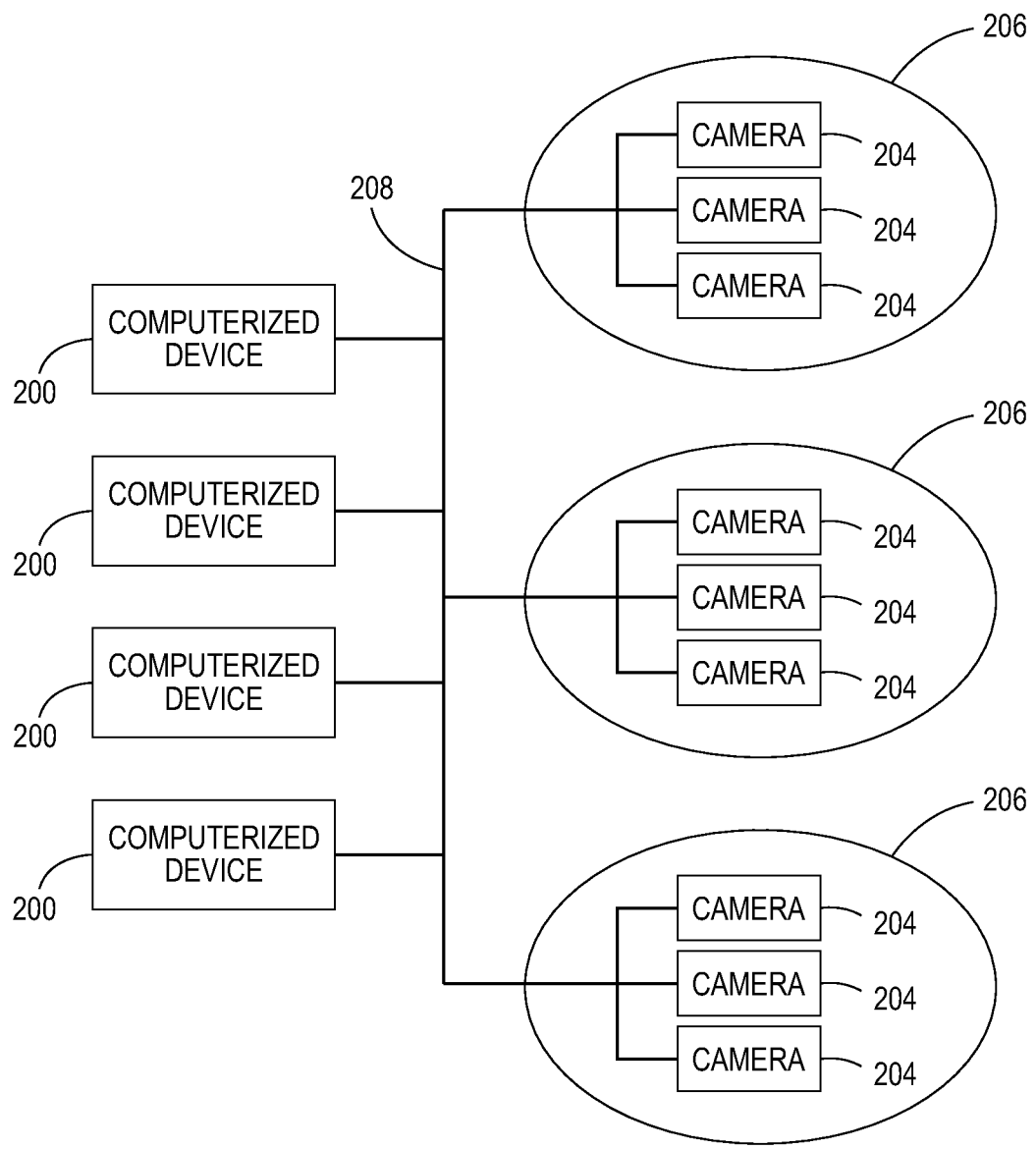
FIG. 2 is a schematic diagram illustrating systems herein.
Figure 16:
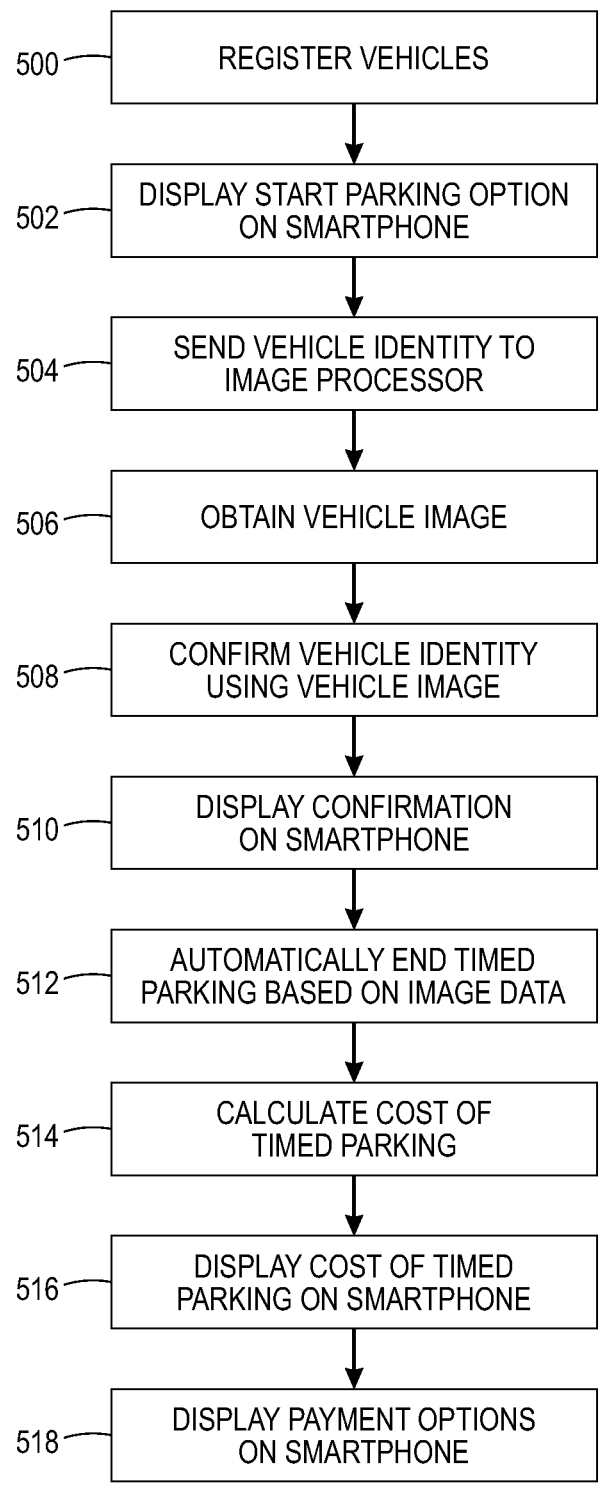
FIG. 16 is a flow diagram of various methods herein.
Figure 17:
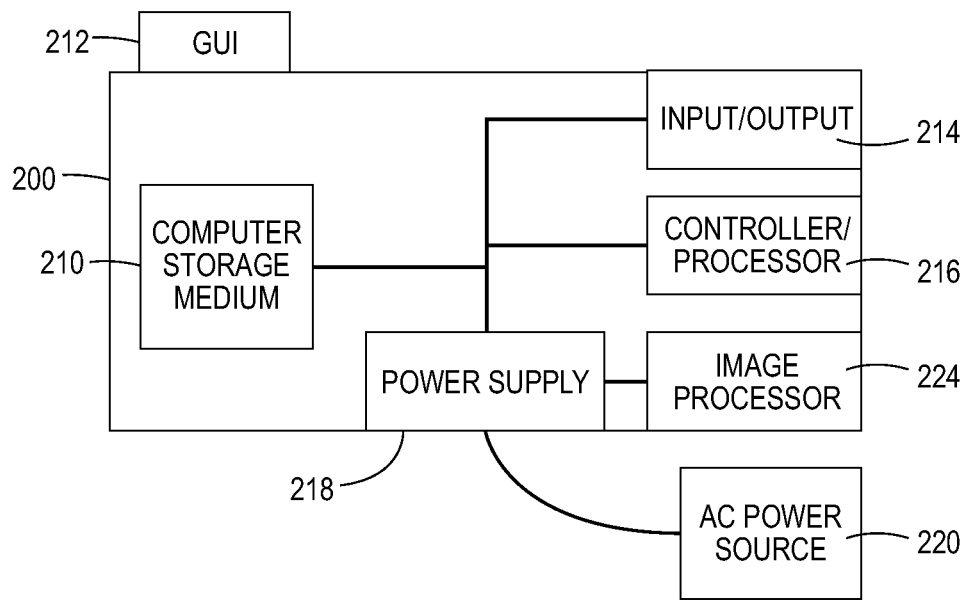
FIG. 17 is a schematic diagram illustrating devices herein.

FIG. 2 conceptually illustrates systems that include various computerized devices 200, 202 connected to cameras 204 located at various different physical locations 206. The computerized devices 200, 202 can include servers, smart phones, personal computers, etc., and are in communication (operatively (meaning directly or indirectly) connected to one another) with each other and with the cameras 204 by way of a local or wide area (wired or wireless) network 208. In this example, computer servers that include image processors and that receive images from the cameras 204 and communicate with the app running on the user's smartphone are identified using identification number 200. The user's (parker's) computerized device is identified using identification number 202, and such computerized devices 202 can include smartphones, cell phones, personal digital assistants (PDA's), portable computers, in-car computers, etc. Such computerized devices 200, 202 are illustrated in FIGS. 16 and 17, and are discussed in detail below.

With systems herein, the cameras 204 obtain images of the scene 120 containing vehicle parking spaces 122. The cameras 204 are permanently positioned to view the scene 120 containing the vehicle parking spaces 122. Also, the image processor 200 is operatively connected to the camera 204 through the network 208. An app 300 comprising a program of instructions operates on the user portable computing device 202, and the app 300 is in communication with the image processor 200 over the computerized network 208.

Figure 3:
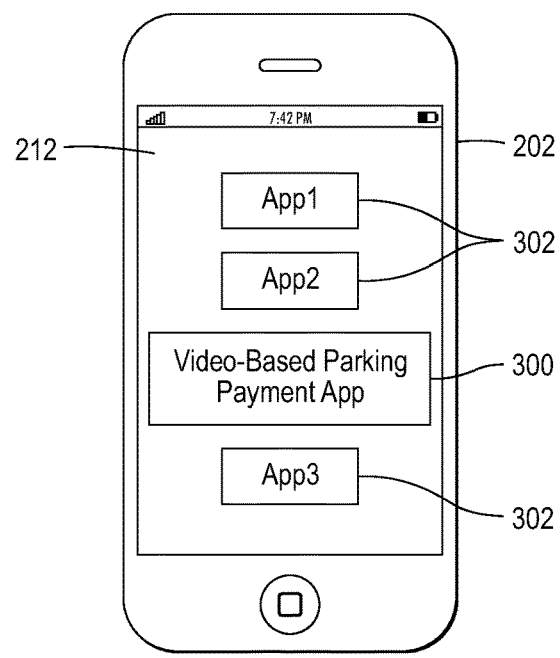
FIG. 3 is a schematic diagram illustrating an app herein operating on a portable computing device.

As shown in FIG. 3, methods and devices herein provide a video-based parking payment app 300 that can be downloaded (e.g., from an app store) to the user's portable computing device 202. As shown in FIG. 3, the video-based parking payment app 300 can be displayed on the graphic user interface 212 of the user's portable computing device 202 along with other apps 302.

Figure 4:
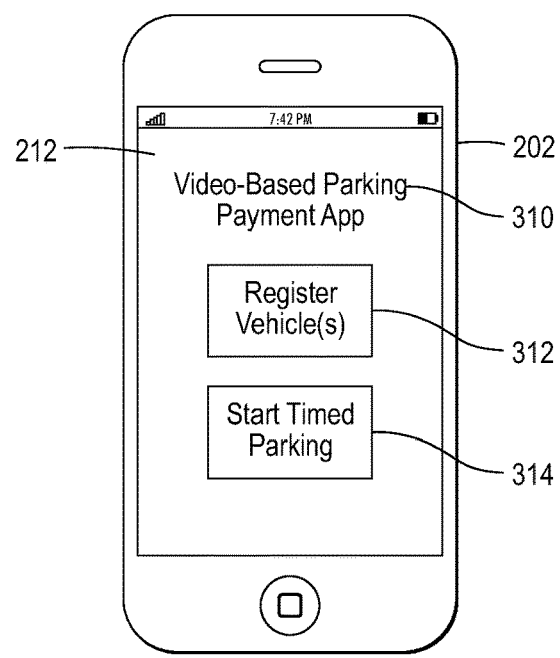
FIG. 4 is a schematic diagram illustrating an app herein operating on a portable computing device.

When item 300 in FIG. 3 is selected by the user, the app 300 causes the graphic user interface 212 of the user portable computing device to display a video-based parking payment screen 310. The video-based parking payment screen 310 includes a menu option to register one or more vehicles 312, and a "start timed parking" menu option 314 to begin a timed payment session for a vehicle parking space (e.g., one of the vehicle parking spaces 122 within the scene 120) as shown in FIG. 4. As would be understood by those skilled in the art, these options 312, 314 could be included on different screens and are only shown together in FIG. 4 for convenience of illustration.

Figure 5:
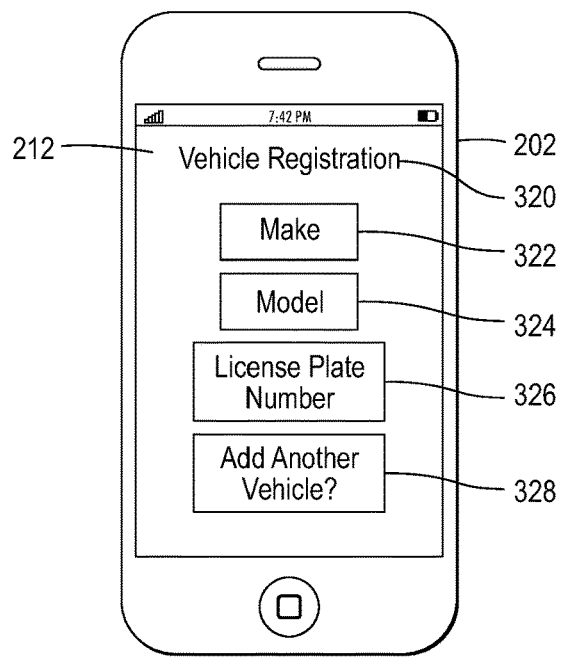
FIG. 5 is a schematic diagram illustrating an app herein operating on a portable computing device.

If menu item 312 is selected in FIG. 4, a vehicle registration screen 320 can be displayed on the graphic user interface 212, as shown in FIG. 5. FIG. 5 is only one example of the information that can be acquired for a registered vehicle, and the methods and devices herein could acquire additional/different information. In this example, the app 300 can optionally register the vehicle 112 by receiving information from the user on make 322, model 324, and license plate number 326 of the vehicle into the app 300 (through the graphic user interface 212 of the user portable computing device). Menu option 328 allows the user to register multiple vehicles with the app 300.

Figure 6:
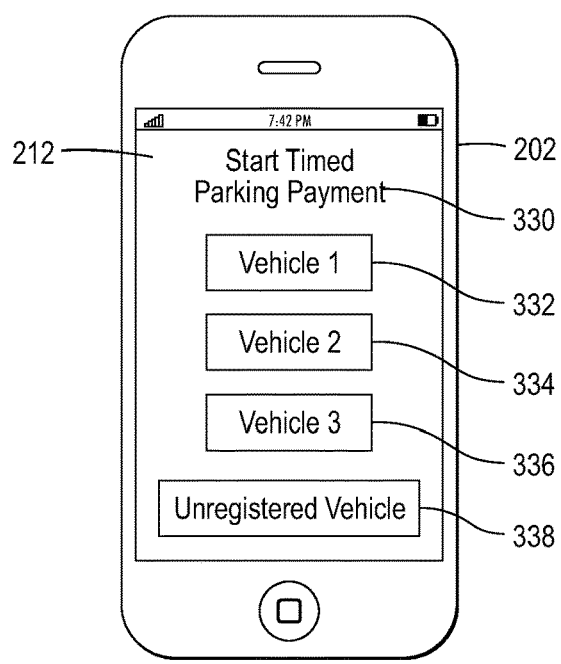
FIG. 6 is a schematic diagram illustrating an app herein operating on a portable computing device.

If the user selects the start timed parking option in item 314 in FIG. 4, a screen similar to the start timed parking payment screen 330 can be displayed on the graphic user interface 212, as shown in FIG. 6. As shown in FIG. 6, if the user has previously registered multiple vehicles, they can choose from among such previously registered vehicles using menu options 332, 334, or 336. Alternatively, if the user has not previously registered a vehicle (and does not want to) they can simply proceed as parking an unregistered vehicle using menu choice 338 in FIG. 6. The start timed parking payment screen 330 is optional and may not be displayed under a number of circumstances to simplify operation of the app 300; for example, if the user only has a single vehicle registered, the start timed parking payment screen 330 may be omitted, and the app 300 can simply proceed directly to the start timed parking payment screen 340 shown in FIG. 7 after the user selects the start timed parking option in item 314 in FIG. 4.

Figure 7:
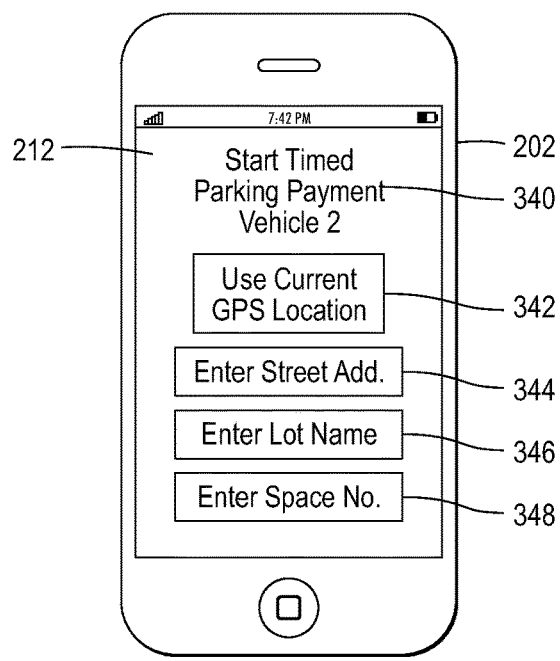
FIG. 7 is a schematic diagram illustrating an app herein operating on a portable computing device.

Again, the start timed parking payment screen 340 shown in FIG. 7 is only one example of the information that can be acquired to start paid parking, and the methods and devices herein could acquire additional/different information. In the example shown in FIG. 7, the user can be presented with many options to allow the app 300 to identify where the parker is parking their vehicle. In some limited examples the app 300 can automatically acquire the current position of the vehicle by having the parker select option 342 indicating that the current global positioning system (GPS) position should be used. As used herein, GPS can be satellite-based, ground-based, WiFi-based, etc., and GPS is merely used herein as shorthand for all location identification systems whether currently known or developed in the future. Further, the start timed parking payment screen 340 shown in FIG. 7 can optionally be omitted and may not be displayed under a number of circumstances to simplify operation of the app 300; for example, if the app 300 determines that the GPS signal is very accurate, the start timed parking payment screen 340 may be omitted, and the app 300 can simply proceed directly to the vehicle confirmation screen 350 shown in FIG. 8 after the user selects the start timed parking option in item 314 in FIG. 4.

However, computerized location systems (e.g., GPS) have some inherent inaccuracies (especially in urban areas where tall buildings can block satellite signals). Therefore, the start timed parking payment screen 340 shown in FIG. 7 can provide the parker with options to provide a street address 344, enter a parking lot name 346, or enter one of the parking space numbers 112. In one example, if the parker selects the menu option to proceed with an unregistered vehicle 338 in FIG. 6, the parker may be required to at least enter a parking space number in menu option 348 (and may be required to enter a street address in menu option 344, if the GPS position is deemed to be below a specific accuracy level) in the start timed parking payment screen 340 shown in FIG. 7.

In this example, the parker using the app 300 is parking vehicle 112 in numbered parking space 374 (shown in FIG. 1). The app 300 sends the image processor 200 an indication that the app 300 is being used to pay for a parking space and the identity of the vehicle parking space 374 and/or the identity of the vehicle 112 (and such is done in response to user selection of the start timed parking option in item 314 in FIG. 4 potentially supplemented with information from the screens 330 and 340 in FIGS. 6 and 7).

In response to the app 300 sending the image processor 200 the identity of the vehicle parking space 374 and/or the identity of the vehicle 112, the image processor 200 instructs the camera 204 to obtain an image of the vehicle 112 parked in the vehicle parking space 374. In response, the camera sends the image of the vehicle 112 parked in the vehicle 112 parking space 374 to the image processor 200. The image obtained by the camera 204 may include a single parked vehicle or many parked vehicles, depending upon the capabilities and position of the camera(s) 204.

The image processor 200 then confirms that the correct vehicle is parked in the vehicle parking space (e.g., vehicle 112 is parked in space 374) based on matching the image of the vehicle 112 parked in the vehicle parking space 374 with the identity of the vehicle parking space 374 and/or the identity of the vehicle 112 parked in the vehicle 112 parking space 374. For example, even if the image obtained by the camera 204 includes many parked vehicles, the image processor 200 can confirm the identity of the vehicle 112 parked in the vehicle parking space 374 based on information identified in the image (such as the license plate number of the vehicle 112, the make of the vehicle 112, the model of the vehicle 112, the identity of the vehicle parking space 374, etc.) matching previously stored data for registered vehicles and registered parking scenes. If the image contains multiple vehicles, the image processor 200 can crop the image to produce an image that substantially contains only the specific vehicle 112 of the parker (potentially with small portions of other vehicles within the cropped image, depending upon the proximity of the other vehicles and the angle from which the camera 204 obtains the image).

Once the image processor 200 has confirmed the identity and location of the vehicle, the image processor 200 sends a confirmation to the app 300 that contains the vehicle identity (e.g., license plate number, make, model, and possibly the parking space number) and an image of the vehicle 112 parked in parking space 374 (potentially automatically cropped to contain only vehicle 112).

Figure 8:
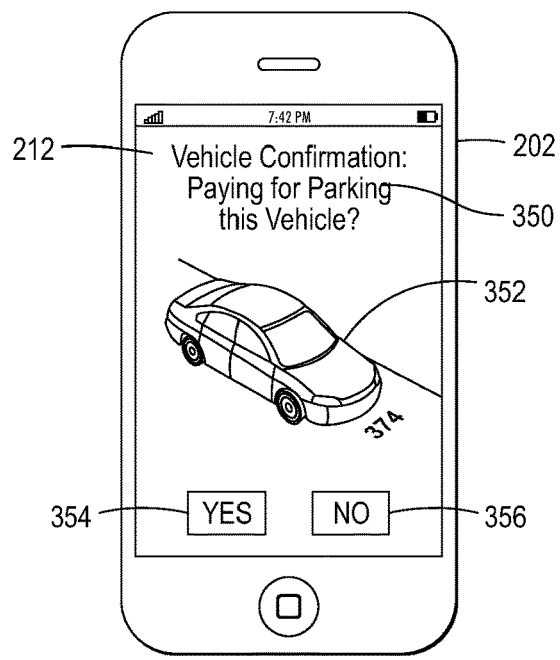
FIG. 8 is a schematic diagram illustrating an app herein operating on a portable computing device.

The app 300 then causes the graphic user interface 212 of the user portable computing device to display the confirmation 352, as shown in the vehicle confirmation screen 350 in FIG. 8. In the example shown in FIG. 8, the confirmation 352 only includes the image of the vehicle 112 (and can show, for example, parking space 374) obtained by the camera 204; however, additional or alternative information could be displayed in the confirmation 352 (make, model, license plate number, etc.). In addition, the parker can optionally be requested to confirm whether the image 352 is of the correct vehicle through "yes" and "no" menu selections 354 and 356 shown in FIG. 8. As with many of the previous screens, depending upon the balance between ease of use of the app 300 and the need to confirm that the correct vehicle is being monitored, the vehicle confirmation screen 350 in FIG. 8 can be optionally omitted.

Figure 9:
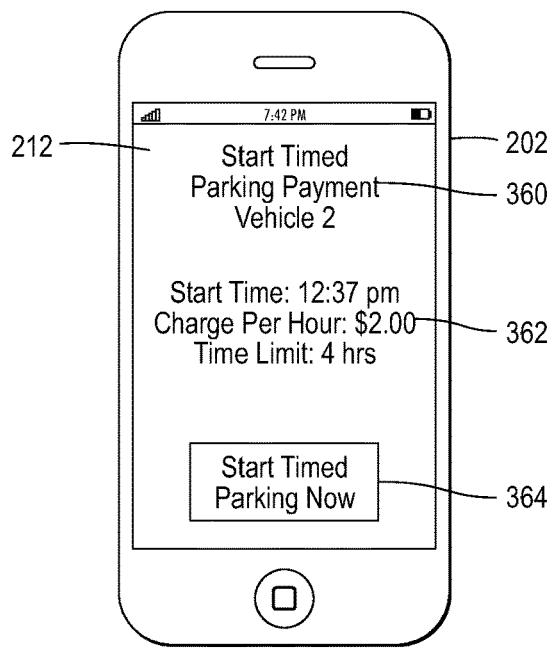
FIG. 9 is a schematic diagram illustrating an app herein operating on a portable computing device.

As shown in FIG. 9, an additional or alternative confirmation 362 provided in a start timed parking payment screen 360 can identify the vehicle simply as "vehicle 2" and indicate the starting time, the charge per unit time, and any other restrictions (such as a maximum 4 hour limit). A menu option 364 to begin the time when the user will be charged for parking can be presented in the start timed parking payment screen 360, as shown in FIG. 9. Again, depending upon the balance between ease of use of the app 300 and the need to confirm that the correct vehicle is being monitored, the start timed parking payment screen 360 in FIG. 9 can be optionally omitted (and the time for parking charges can begin when menu option 314 in FIG. 4 is selected instead of when menu option 364 in FIG. 9 is selected).

Figure 10:
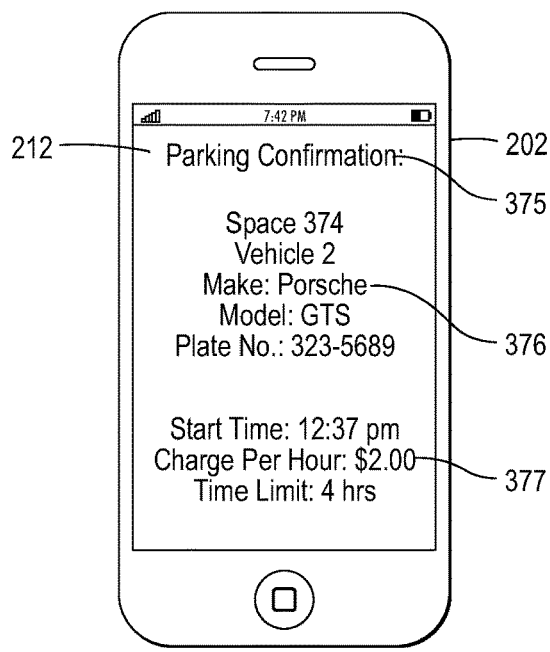
FIG. 10 is a schematic diagram illustrating an app herein operating on a portable computing device.

The parking confirmation screen 375 in FIG. 10 can optionally be displayed on the graphic user interface 212 to provide a summary of what is occurring based on the user's selections. Thus, as shown in FIG. 10, the summary can display which vehicle is parked (by shorthand reference, make, model, license plate number, etc.), the vehicle parking space number as shown in item 376, and/or the summary can show the beginning time for the timed payment session, the parking charge rate, as well as any other restrictions in item 377.

Figure 11:
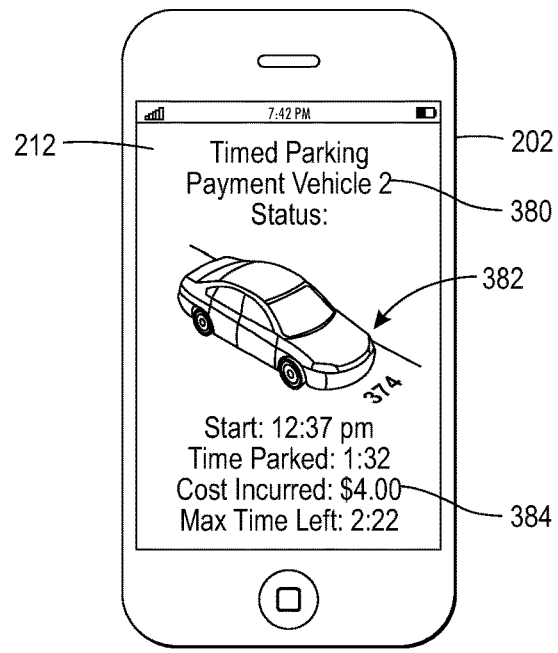
FIG. 11 is a schematic diagram illustrating an app herein operating on a portable computing device.

Periodically, the app 300 can optionally display a status screen 380 indicating the status of the parked vehicle 112, as shown in FIG. 11 (according to an established time schedule, or upon user selection of an option to display the parking status). Any of the foregoing data can be displayed in the status screen 380, such as a current picture of the vehicle 382 and the charges incurred so far 384 (e.g., the start time, the total time the vehicle has been parked, the cost incurred so far, and (if there are parking restrictions) the maximum amount of time remaining that the vehicle 112 can remain parked in the parking space 374. The current picture of the vehicle 382 allows the parker to check on their vehicle periodically to see if another parker has parked very close, if there is damage to the vehicle, if there is snow on the vehicle, if it is getting dark where they parked, etc.

Figure 12:
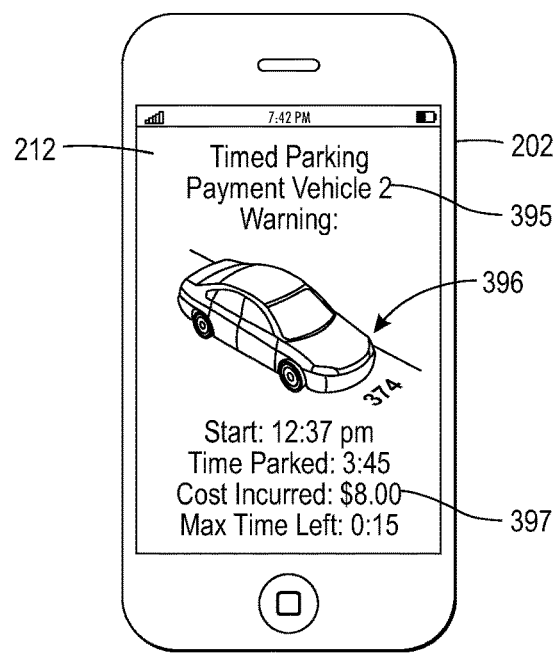
FIG. 12 is a schematic diagram illustrating an app herein operating on a portable computing device.

Additionally, as shown in FIG. 12, a warning screen 390 can be displayed if the parked vehicle 112 may be approaching a violation (such as the 4 hour parking maximum for parking space 374 used in this example). The warning screen 395 can be presented at some previously set time (e.g., 30 min., 20 min., 15 min., etc.) before the violation will occur. Similar to the status screen 380 in FIG. 11, in the warning screen 395 in FIG. 12, a current picture 396 of the vehicle 112 and the charges incurred so far 397 (e.g., the start time, the total time the vehicle has been parked, the cost incurred so far, and the maximum amount of time remaining that the vehicle 112 can remain parked in the parking space 374) can optionally be displayed to assist the parker. As with many of the screens discussed above, screens 380 and 395 in FIGS. 11 and 12 can be omitted to simplify the user's experience with the app 300.

The current pictures 382 and 396 are obtained after the first image 352 is obtained (and are obtained within minutes or seconds of any status/warning request or schedule). Further, the current pictures 382 and 396 are obtained by the camera 204 in response to a request from the image processor 200 responding to a user status request, a periodic status schedule request, and/or a warning status schedule request).

Later, the image processor 200 automatically ends the timed payment session for the vehicle 112 in parking space 374, based on images of the scene obtained through the camera 204 showing that the identified vehicle 112 no longer occupies the vehicle 112 parking space 374. The image processor 200 then calculates the cost of the timed payment session based upon the duration between the beginning time and an ending time (the ending time is when the image processor 200 automatically ends the timed payment session).

Figure 13:
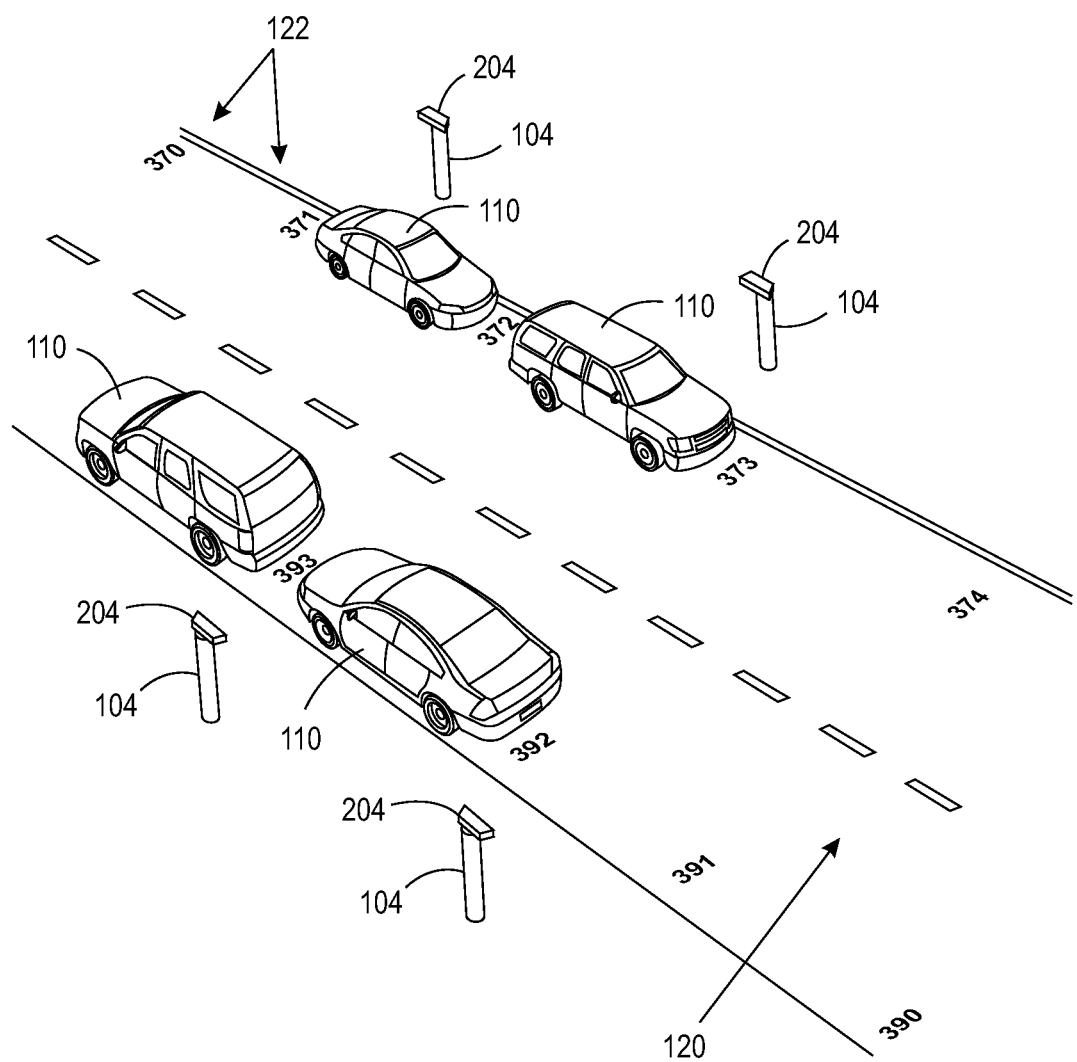
FIG. 13 is a schematic perspective diagram illustrating a parking scene.

More specifically, the image processor 200 constantly and automatically monitors the scene 120 (either through periodic photographs or a video feed constantly provided by the camera(s) 204) to identify the time that the vehicle 112 is driven away from the parking space 374 and the image processor 200 establishes the time that vehicle 112 is driven away as the ending time for the parking charges incurred by vehicle 112. This occurs, for example, as shown in FIG. 13 when image of the scene 120 obtained by the camera 204 shows that the vehicle 112 is no longer positioned in parking space 374. Because the image processor 200 has previously confirmed that vehicle 112 is being monitored, it can automatically determine the ending time for parking charges for vehicle 112.

Figure 14:
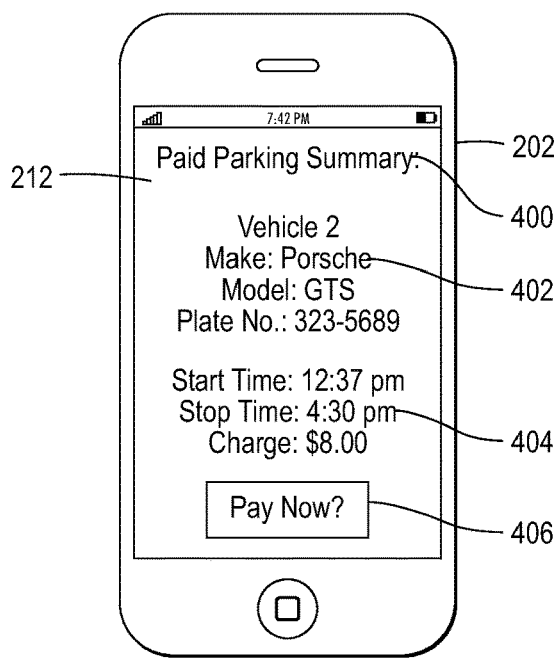
FIG. 14 is a schematic diagram illustrating an app herein operating on a portable computing device.

Once the vehicle 112 is driven away, the image processor 200 then sends, to the app 300 the ending time for parking charges. Then, either the app 300 or the image processor 200 can calculate the parking duration and parking charges. The app 300 causes the graphic user interface 212 of the user portable computing device to display a paid parking summary screen 400, shown in FIG. 14. As shown in FIG. 14, the paid parking summary screen 400 can indicate as little as the parking charge alone (404) or more information can be displayed, such the identity of the vehicle 402 (shorthand name, make, model, plate number, etc.) the details of the cost of the timed payment session 404 (e.g., the duration, the beginning time, and the ending time).

Figure 15:
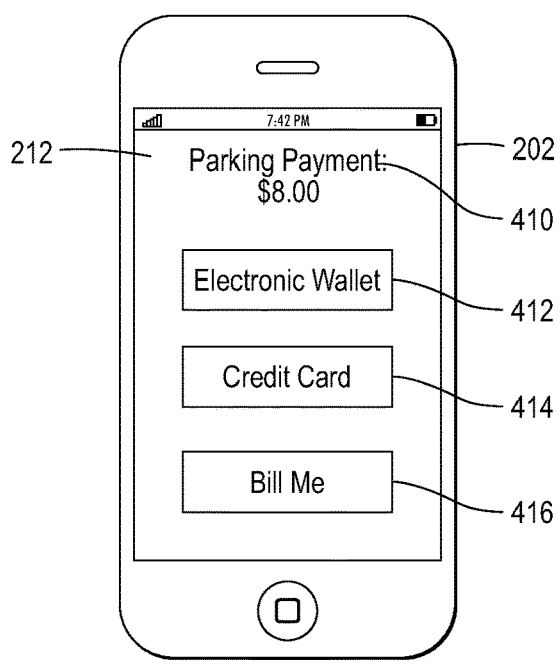
FIG. 15 is a schematic diagram illustrating an app herein operating on a portable computing device.

Additionally, as shown in FIG. 14, the app 300 causes the graphic user interface 212 of the portable computing device to display an option to pay the cost of the timed payment session 406. In FIG. 15, a parking payment screen 410 can be displayed in response to the pay now menu option 406 being selected. The parking payment screen 410 can display the parking cost ($8.00) and menu choices for different payment options (e.g., electronic wallet 412, credit card 414, a bill me option 416). In the "bill me" option, a bill can be mailed (or e-mailed) to the parker to allow them to pay later. The app 300 causes payment to be made for the cost of the timed payment session based upon selection of the option (412, 414, or 416) to pay the cost of the timed payment session.

As noted above, many of the steps and screens shown above are optional and such screens can be displayed (or not displayed) based on user preferences set by the user through any standard preference menu. For example, one user may wish a highly automated process and may wish for most screens to be omitted. Such users may choose to only have to select the app 300 (FIG. 3) and the "start timed parking" option 314 (FIG. 4), and leave all other steps automated. For such a user, the methods and devices herein provide parking for a preferred pre-registered vehicle, and automatically identify the parking space (e.g., through GPS and/or space number 122). Further, for such user preferences, no status is displayed and, at the ending time, the methods and devices simply charge the calculated parking fee to a previously identified preferred payment method, without providing the user with any notification of such payment action. Thus, such low interaction users can simply select the app and the start option, and the methods and devices herein automatically perform all other aspects without further notification to the user to simplify the user experience. Even with such low-notification preferences, the methods and systems herein can provide notice to the user if some condition requires user input (e.g., if the location of the vehicle cannot be automatically established with sufficient accuracy, a screen similar to that shown in FIG. 7 may be presented to the user). Other users may wish to see more of (or all) the screens shown in FIGS. 4-12 and 14-15, as established by user preferences in a user preference menu.

Figure 18:
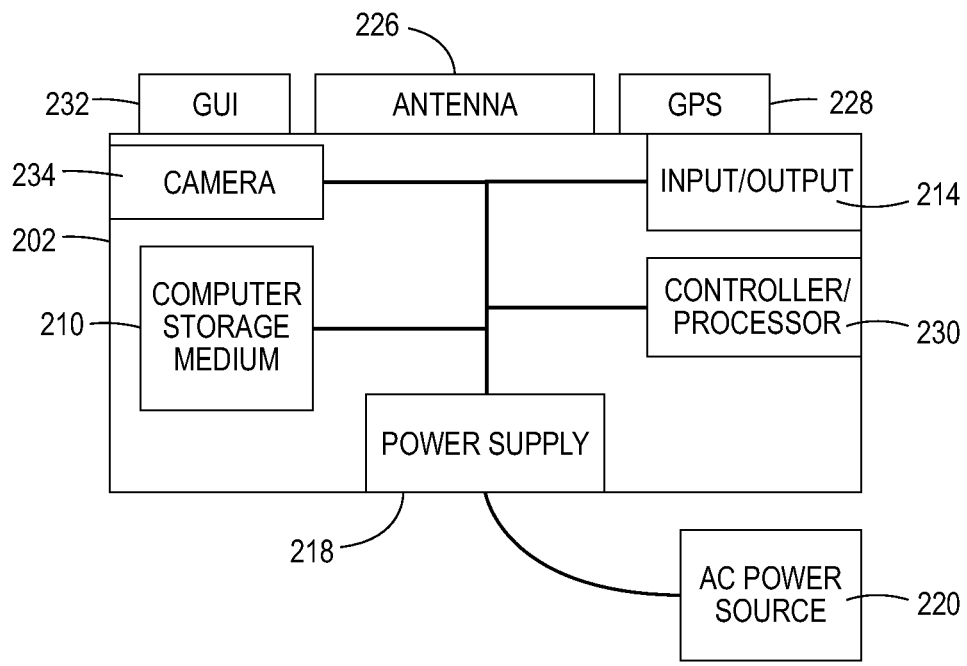
FIG. 18 is a schematic diagram illustrating devices herein.

FIG. 18 is a flowchart illustrating some aspects of exemplary methods herein. These methods automatically obtain images of a scene containing vehicle parking spaces using a camera permanently positioned to view the scene containing the vehicle parking spaces. In item 500, the flowchart beings by allowing users to optionally register one or more vehicles by having a smartphone app receive information on make, model, and license plate number of the vehicle from the user operating the smartphone. As is well known, an app is a program of instructions operating on the user portable computing device (e.g., user's smartphone). In item 502, such methods display, on a graphic user interface of a user portable computing device, a start timed parking option to begin a timed payment session for a vehicle parking space of vehicle parking spaces within the scene (using the app).

In item 504 these methods automatically send, from the application to an image processor, the identity of the vehicle parking space and/or the identity of the vehicle parked in the vehicle parking space in response to selection of the start timed parking option. The image processor is operatively connected to the camera, and the application is in communication with the image processor over a computerized network.

Such methods automatically obtain an image of the vehicle parked in the vehicle parking space, using the camera in item 506, in response to the selection of the start timed parking option and send the image of the vehicle parked in the vehicle parking space from the camera to the image processor. These methods then automatically confirm that the vehicle is parked in the vehicle parking space in item 508, based on the image processor matching the image of the vehicle parked in the vehicle parking space with the identity of the vehicle parking space and/or the identity of the vehicle parked in the vehicle parking space, and send a confirmation to the application. The process of confirming the identity of the parked vehicle in item 508 can be based on information identified in the image of the vehicle parked in the vehicle parking space, including the license plate number of the vehicle, the make of the vehicle, the model of the vehicle, and the identity of the vehicle parking space.

In item 510, these methods automatically display the confirmation on the graphic user interface of the user portable computing device (using the application). The confirmation 510 identifies the vehicle parked in the vehicle parking space and identifies a beginning time for the timed payment session. The confirmation 510 can include: the image of the vehicle parked in the vehicle parking space; the make, model, and license plate number of the vehicle parked in the vehicle parking space; parking restrictions; and the cost per unit time for the vehicle parking space.

Then, in item 512, such methods automatically end the timed payment session for the vehicle parking space based on images of the scene obtained through the camera showing the identified vehicle not occupying the vehicle parking space, using the image processor. In item 514, these methods automatically calculate the cost of the timed payment session, using the image processor or the app, based upon the duration between the beginning time and the ending time when the image processor automatically ends the timed payment session. In turn, these methods display the cost of the timed payment session, the duration, the beginning time, and the ending time on the graphic user interface of the user portable computing device using the application in item 516.

Additionally, in item 518 such methods can automatically display, on the graphic user interface of the portable computing device, an option to pay the cost of the timed payment session using the application. Similarly, such methods can cause automatic payment to be made for the cost of the timed payment session based upon selection of the option to pay the cost of the timed payment session from item 518, using the application.

Again, apps 300 herein comprise a program of instructions operating on a user portable computing device 202. The apps 300 work in conjunction with a camera 204 that obtains images of a scene containing vehicle parking spaces. The camera 204 is permanently positioned to view the scene containing the vehicle parking spaces. The apps 300 also work in conjunction with an image processor 200 operatively connected to the camera 204. The apps 300 are in communication with the image processor 200 over a computerized network.

The apps 300 cause a graphic user interface 212 of the user portable computing device 202 to display a start timed parking option to begin a timed payment session for a vehicle parking space of the vehicle parking spaces within the scene. The apps 300 send the image processor 200 the identity of the vehicle parking space and/or the identity of a vehicle parked in the vehicle parking space in response to selection of the start timed parking option.

The camera 204 obtains an image of the vehicle parked in the vehicle parking space in response to the selection of the start timed parking option and sends the image of the vehicle parked in the vehicle parking space to the image processor 200. The image processor 200 confirms that the vehicle is parked in the vehicle parking space based on matching the image of the vehicle parked in the vehicle parking space with the identity of the vehicle parking space and/or the identity of the vehicle parked in the vehicle parking space, and sending a confirmation to the apps 300.

The apps 300 cause the graphic user interface 212 of the user portable computing device 202 to display the confirmation. The confirmation identifies the vehicle parked in the vehicle parking space and identifies the beginning time for the timed payment session. The image processor 200 automatically ends the timed payment session for the vehicle parking space based on images of the scene obtained through the camera 204 showing the identified vehicle not occupying the vehicle parking space. The image processor 200 or the app 300 calculates the cost of the timed payment session based upon the duration between the beginning time and the ending time when the image processor 200 automatically ends the timed payment session. The apps 300 cause the graphic user interface 212 of the user portable computing device 202 to display the cost of the timed payment session, the duration, the beginning time, and the ending time.

The hardware described herein plays a significant part in permitting the foregoing method to be performed, rather than function solely as a mechanism for permitting a solution to be achieved more quickly, (i.e., through the utilization of a computer for performing calculations). More specifically, as would be understood by one ordinarily skilled in the art, the processes described herein cannot be performed by human alone (or one operating with a pen and a pad of paper) and instead such processes can only be performed by a machine. Specifically, processes such as electronic transmission of image and other data over networks, etc., require the utilization of different specialized machines. Therefore, for example, the image analysis performed by the image processor to confirm the identity of the parked vehicle and to identify when the vehicle is no longer in a specific parking space is integral with the processes performed by methods herein. Further, such machine-only processes are not mere "post-solution activity" because the image processing to confirm vehicle identity and end the parking time are integral with the methods herein. Similarly, the electronic transmissions of image and other data utilize special-purpose equipment (telecommunications equipment, routers, switches, etc.) that are distinct from a general-purpose processor. Also, the data transmission is integral with the process performed by the methods herein, and is not mere post-solution activity, because the processes of the methods herein rely upon the network-based transmission to obtain images, parking rates, parking restrictions, etc., and cannot be performed without electronic transmission devices. In other words, these various machines are integral with the methods herein because the methods cannot be performed without the machines (and cannot be performed by humans alone).

Additionally, the methods herein solve many highly complex technological problems. For example, as mentioned above, in "start-stop" pay-by-phone parking, a parker may forget to "stop" after ending of the parking session resulting in the parker being charged for time they did not use the parking space. In "start-duration" pay-by-phone parking, the parker has to estimate the parking duration, which may result in the parker being charged for time they did not use the parking space, or result in the parker not setting a long enough duration and potentially being fined. Methods herein solve such technological problems by automatically identifying a vehicle in an image scene, and automatically ending the paid parking when the vehicle leaves the parking space, without requiring any user input (other than driving the vehicle away from the parking space). This makes the app much more user friendly, eliminates the need for the user to constantly monitor whether the parking time (the user previously estimated) is about to expire, and avoids having the user be charged for parking fees when their vehicle is not present in the parking space. By granting such benefits to parking service providers, the methods herein reduce the amount and complexity of hardware and software needed to be purchased, installed, and maintained by users and parking service providers, thereby solving a substantial technological problem that is experienced today.

FIG. 17 illustrates a computerized device 200, which can be used with systems and methods herein and can comprise, for example, a server, a personal computer, a portable computing device, etc. The computerized device 200 includes a controller/tangible processor 216 and a communications port (input/output) 214 operatively connected to the tangible processor 216 and to the computerized network 208 external to the computerized device 200. Also, the computerized device 200 can include at least one accessory functional component, such as a graphical user interface (GUI) assembly 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. An image processor 224 is connected to the other components, and the image processor 224 is a specialized processor (e.g., containing specialized filters, buffers, application specific integrated circuits (ASICs), ports, etc.) that are specialized for processing and analyzing pixels and shapes, colors, etc., in digital images. Thus, as shown in FIG. 17, a body housing has one or more functional components that operate on power supplied from an alternating current (AC) source 220 by the power supply 218. The power supply 218 can comprise a common power conversion unit, power storage element (e.g., a battery, etc), etc.

FIG. 18 also illustrates a computerized device 202, such as a portable computerized device, which includes many of the components mentioned above in FIG. 17 (and similar items are provided the same reference numeral in the drawings). Portable computing device 202 shown in FIG. 18 can comprise, for example, a special-use device such as a smartphone, tablet, or other special-purpose portable computerized element that is easily carried by a user. Such devices are special-purpose devices distinguished from general-purpose computers because such devices include specialized hardware, such as: specialized processors 230 (e.g., containing specialized filters, buffers, application specific integrated circuits (ASICs), ports, etc.) that are specialized for phone communications, for use with cellular networks, etc.; specialized graphic user interfaces 232 (that are specialized for reduced power consumption, reduced size, anti-glare, etc.); antenna 226 (that are specialized for phone communications, for use with cellular networks, etc.); specialized converters; GPS equipment 228; cameras and optical devices 234 (that are specialized for obtaining images with camera components, have specialized batteries, have specialized protective cases for use in harsh environments, etc.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a camera obtaining images of a scene containing vehicle parking spaces, said camera being stationary and positioned to view said scene containing said vehicle parking spaces;
   an image processor operatively connected to said camera; and
   an application comprising a program of instructions operating on a user portable computing device,
   said application being in communication with said image processor over a computerized network,
   said application causing a graphic user interface of said user portable computing device to display a start timed parking option to begin a timed payment session for a vehicle parking space of said vehicle parking spaces within said scene at a beginning time,
   said application sending said image processor at least one of: an identity of said vehicle parking space; and an identity of a vehicle parked in said vehicle parking space in response to selection of said start timed parking option,
   said camera obtaining an image of said vehicle parked in said vehicle parking space in response to said selection of said start timed parking option and sending said image of said vehicle parked in said vehicle parking space to said image processor,
   said image processor providing said image of said vehicle parked in said vehicle parking space to said application,
   said application displaying said image of said vehicle parked in said vehicle parking space on said graphic user interface of said user portable computing device with a request to confirm whether said image of said vehicle parked in said vehicle parking space is of a correct vehicle,
   in response to a confirmation supplied to said application through said graphic user interface of said user portable computing device that said image of said vehicle parked in said vehicle parking space is of said correct vehicle, said image processor confirming said vehicle being parked in said vehicle parking space,
   said image processor automatically ending said timed payment session for said vehicle parking space based on images of said scene obtained through said camera showing said vehicle not occupying said vehicle parking space, and
   one of said image processor and said application calculating a cost of said timed payment session based upon a duration between said beginning time and an ending time of said image processor automatically ending said timed payment session.

2. The system according to claim 1, said application causing said graphic user interface of said user portable computing device to display a confirmation, said confirmation includes identification of said vehicle parked in said vehicle parking space displayed on said graphic user interface of said user portable computing device, and includes a make, model, and license plate number of said vehicle parked in said vehicle parking space.

3. The system according to claim 1, said application causing said graphic user interface of said user portable computing device to display a confirmation, said confirmation is displayed on said graphic user interface of said user portable computing device and includes parking restrictions and a cost per unit time for said vehicle parking space.

4. The system according to claim 1, said image processor confirming said identity of said vehicle parked in said vehicle parking space based on at least one of:
   matching said image of said vehicle parked in said vehicle parking space with at least one of: said identity of said vehicle parking space; and said identity of said vehicle parked in said vehicle parking space; and
   information identified in said image of said vehicle parked in said vehicle parking space,
   said information comprising at least one of:
   a license plate number of said vehicle;
   a make of said vehicle;
   a model of said vehicle; and
   said identity of said vehicle parking space.

5. The system according to claim 1, said application registering said vehicle by receiving information on make, model, and license plate number of said vehicle into said application through said graphic user interface of said user portable computing device.

6. The system according to claim 1, said application causing said graphic user interface of said portable computing device to display an option to pay said cost of said timed payment session, and
   said application causing payment to be made for said cost of said timed payment session based upon selection of said option to pay said cost of said timed payment session.

7. A method comprising:
   obtaining images of a scene containing vehicle parking spaces using a stationary camera positioned to view said scene containing said vehicle parking spaces;
   displaying, on a graphic user interface of a user portable computing device, a start timed parking option to begin a timed payment session for a vehicle parking space of said vehicle parking spaces within said scene at a beginning time using an application comprising a program of instructions operating on said user portable computing device;
   sending, from said application to an image processor, at least one of: an identity of said vehicle parking space; and an identity of a vehicle parked in said vehicle parking space in response to selection of said start timed parking option, said image processor being operatively connected to said camera, and said application being in communication with said image processor over a computerized network;
   obtaining an image of said vehicle parked in said vehicle parking space, using said camera, in response to said selection of said start timed parking option;
   sending said image of said vehicle parked in said vehicle parking space from said camera to said image processor;
   providing said image of said vehicle parked in said vehicle parking space from said image processor to said application;
   displaying said image of said vehicle parked in said vehicle parking space on said graphic user interface of said user portable computing device with a request to confirm whether said image of said vehicle parked in said vehicle parking space is of a correct vehicle, using said application;
   in response to a confirmation supplied to said application through said graphic user interface of said user portable computing device that said image of said vehicle parked in said vehicle parking space is of said correct vehicle, confirming said vehicle being parked in said vehicle parking space;

automatically ending said timed payment session for said vehicle parking space at an ending time based on images of said scene obtained through said camera showing said vehicle not occupying said vehicle parking space, using said image processor; and calculating a cost of said timed payment session based upon a duration between said beginning time and an ending time of said image processor automatically ending said timed payment session.

8. The method according to claim 7, further comprising displaying a confirmation on said graphic user interface comprising a make, model, and license plate number of said vehicle parked in said vehicle parking space.

9. The method according to claim 7, further comprising displaying a confirmation on said graphic user interface comprising parking restrictions and a cost per unit time for said vehicle parking space.

10. The method according to claim 7, said confirming said identity of said vehicle parked in said vehicle parking space being based on at least one of:

matching said image of said vehicle parked in said vehicle parking space with at least one of: said identity of said vehicle parking space; and said identity of said vehicle parked in said vehicle parking space; and information identified in said image of said vehicle parked in said vehicle parking space, said information comprising at least one of:
a license plate number of said vehicle;
a make of said vehicle;
a model of said vehicle; and
said identity of said vehicle parking space.

11. The method according to claim 7, further comprising registering said vehicle by receiving information on make, model, and license plate number of said vehicle into said application through said graphic user interface of said user portable computing device.

12. The method according to claim 7, further comprising displaying, on said graphic user interface of said portable computing device, an option to pay said cost of said timed payment session using said application, and causing payment to be made for said cost of said timed payment session based upon selection of said option to pay said cost of said timed payment session, using said application.

13. A system comprising:
a computerized device maintaining an application comprising a program of instructions,
said computerized device supplying said application to a user portable computing device over a network,
said application working in conjunction with a camera obtaining images of a scene containing vehicle parking spaces, said camera being stationary and positioned to view said scene containing said vehicle parking spaces,
said application working in conjunction with an image processor operatively connected to said camera,
said application being in communication with said image processor over a computerized network,
said application causing a graphic user interface of said user portable computing device to display a start timed parking option to begin a timed payment session for a vehicle parking space of said vehicle parking spaces within said scene at a beginning time, said application sending said image processor at least one of: an identity of said vehicle parking space; and an identity of a vehicle parked in said vehicle parking space in response to selection of said start timed parking option, said camera obtaining an image of said vehicle parked in said vehicle parking space in response to said selection of said start timed parking option and sending said image of said vehicle parked in said vehicle parking space to said image processor, said image processor providing said image of said vehicle parked in said vehicle parking space to said application, said application displaying said image of said vehicle parked in said vehicle parking space on said graphic user interface of said user portable computing device with a request to confirm whether said image of said vehicle parked in said vehicle parking space is of a correct vehicle, in response to a confirmation supplied to said application through said graphic user interface of said user portable computing device that said image of said vehicle parked in said vehicle parking space is of said correct vehicle, said image processor confirming said vehicle being parked in said vehicle parking space, said image processor automatically ending said timed payment session for said vehicle parking space based on images of said scene obtained through said camera showing said vehicle not occupying said vehicle parking space, one of said image processor and said application calculating a cost of said timed payment session based upon a duration between said beginning time and an ending time of said image processor automatically ending said timed payment session, and said application causing said graphic user interface of said user portable computing device to display said cost of said timed payment session.

14. The system according to claim 13, said application causing said graphic user interface of said user portable computing device to display a confirmation comprising a make, model, and license plate number of said vehicle parked in said vehicle parking space.

15. The system according to claim 13, said application causing said graphic user interface of said user portable computing device to display a confirmation comprising parking restrictions and a cost per unit time for said vehicle parking space.

16. The system according to claim 13, said application registering said vehicle by receiving information on make, model, and license plate number of said vehicle into said application through said graphic user interface of said user portable computing device.

17. The system according to claim 13, said application causing said graphic user interface of said portable computing device to display an option to pay said cost of said timed payment session, and said application causing payment to be made for said cost of said timed payment session based upon selection of said option to pay said cost of said timed payment session.

* * * * *